United States Patent
Cahoj et al.

(10) Patent No.: US 7,222,866 B1
(45) Date of Patent: May 29, 2007

(54) CHILD'S WAGON

(76) Inventors: James G. Cahoj, 31954 729 Rd., Haigler, NE (US) 69030; Kendal K. Cahoj, 31954 729 Rd., Haigler, NE (US) 69030

(*) Notice: Subject to any disclaimer, the term of this patent is extended or adjusted under 35 U.S.C. 154(b) by 182 days.

(21) Appl. No.: 11/038,907

(22) Filed: Jan. 20, 2005

(51) Int. Cl.
*A63G 13/10* (2006.01)

(52) U.S. Cl. .............. 280/33.991; 280/87.01; 280/29; 280/1.13; 280/11; 280/30

(58) Field of Classification Search ........... 280/87.01, 280/1.13, 827–828, 47.26, 33.991, 29, 30, 280/11
See application file for complete search history.

(56) References Cited

U.S. PATENT DOCUMENTS

| | | | | |
|---|---|---|---|---|
| 36,161 A | * | 8/1862 | MacKenzie | 280/1.192 |
| 2,167,937 A | * | 8/1939 | Clanton | 280/1.22 |
| 2,605,812 A | * | 8/1952 | Benze | 280/7.1 |
| 3,137,510 A | * | 6/1964 | Lemelson | 280/1.22 |
| 4,265,461 A | * | 5/1981 | Okubo | 280/1.13 |
| 6,139,061 A | * | 10/2000 | Lewis | 280/828 |
| 6,325,395 B1 | * | 12/2001 | Frymoyer | 280/47.26 |
| 7,000,933 B2 | * | 2/2006 | Arling et al. | 280/204 |

* cited by examiner

*Primary Examiner*—J. Allen Shriver
*Assistant Examiner*—Cynthia F. Collado
(74) *Attorney, Agent, or Firm*—Thomte, Mazour & Niebergall; Shane M. Niebergall

(57) ABSTRACT

A child's wagon is provided with a mobile base portion and a body portion that define a large inner cavity for storing various articles. Head, neck and tail assemblies may be provided so that the wagon resembles a desired animal. A frame assembly provides the head and neck with realistic movement when the wagon is moved. A cover for the wagon's inner chamber may be shaped like a saddle to support one or more children. Additional accessories such as saddlebags, bottle holsters, and a coiled cord pacifier may be provided. The tongue may be pulled manually or disassembled into a tow bar to be pulled by other motive devices.

18 Claims, 4 Drawing Sheets

CHILD'S WAGON

BACKGROUND OF THE INVENTION

1. Field of the Invention

The present invention relates to wagons for children and more particularly to a child's wagon that resembles an animal, such as a horse, that can be ridden by a child while storing a plurality of toys and necessary supplies for the child inside the wagon.

2. Description of the Related Art

Small toy wagons have been built for children for generations. The wagons are easily identifiable as generally shallow, rectangular-shaped, open boxes that are supported by two pairs of wheels and pulled by a tongue extending from the forward end of the wagon. Over the years, various design improvements have been made to this basic design, such as providing a canopy that is supported above the wagon and positioned over the child riding within the wagon. Various shapes and configurations have also been provided, including those that resemble carriages, trucks, farm equipment and the like. However, regardless of the general design configurations, the usability has remained the same. The child and any toys or supplies traveling with the child sit within the wagon box. Adults or other children grasp a distal end of the tongue and pull the child from one location to another. Unfortunately, these structural configurations and designs have become mundane. Moreover, they provide very little additional storage once one or two children are seated within the wagon.

Accordingly, what is needed is a novel design for a children's wagon that is unique in its design and use to please children, while providing ample storage for toys and supplies.

SUMMARY OF THE INVENTION

The child's wagon of the present invention is generally provided with a base supported on a plurality of wheels. A body portion is coupled to the upper end portion of the base and is shaped to permit one or more children to sit on top of the body and ride the wagon as it is being pulled.

In one preferred embodiment, the body may be adorned with accessories so that the wagon resembles a horse or other desirable animal. Head and neck portions may be coupled with the forward end portion of the wagon, while a tail may be provided to extend from the rearward end portion. A jointed frame assembly within the head and neck portions permit them to simulate a life-like movement normally exhibited by the horse or other animal when it moves.

A large cavity is provided between the base and body portions for the storage of toys and other supplies. An opening is provided in the body portion to provide access to the cavity. In order to supplement the design of the wagon, a cover may be provided for the opening in the shape of a saddle. Reigns may be coupled to the head and provide entertainment and a measure of security to the child riding the wagon. A bottle holster may be draped over the body for carrying one or more bottles. A pair of saddlebags may also be draped across the body for carrying diapers, and the like. A pacifier may be provided at one end of a resilient coil cord and secured to the saddle as well.

The wagon may be pulled from one location to another using the tongue in a conventional fashion. In one preferred embodiment, however, the tongue is provided with a link assembly that permits the tongue to separate into a handle section and a tow bar that may be used to secure the wagon to motive devices, such as a riding lawnmower, tractor, and the like.

It is therefore a principle object of the present invention to provide a child's wagon that resembles, and can be ridden like, an animal.

A further object of the present invention is to provide a child's wagon having a large interior compartment for the storage of toys and other articles.

Still another object of the present invention is to provide a child's wagon having a versatile tongue that may be pulled manually or easily used as a tow bar.

Yet another object of the present invention is to provide a child's wagon that resembles an animal and is provided with a plurality of accessories that can be used for storing various articles while enhancing the animal appearance of the wagon.

A further object of the present invention is to provide a modular child's wagon that may be assembled into a wagon closely resembling an animal, which may be ridden by a child, or left disassembled and used much like a standard child's wagon.

Yet another object of the present invention is to provide a child's wagon that is relatively simple in design and construction.

These and other objects of the present invention will be apparent to those having skill in the art.

DETAILED DESCRIPTION OF THE INVENTION

Figure 1:
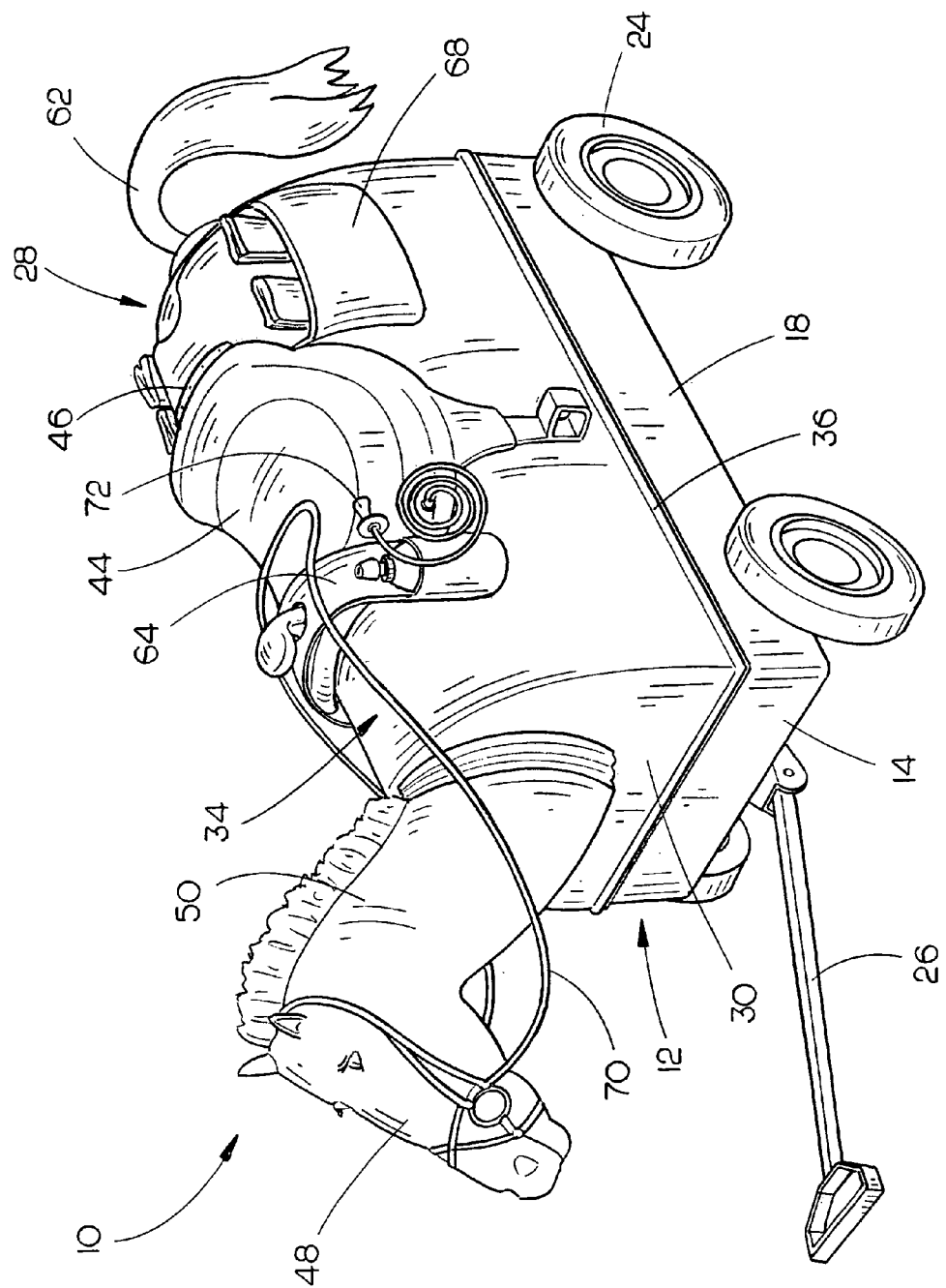
FIG. 1 is an isometric view of one embodiment of the child's wagon of the present invention.

The children's wagon 10 of the present invention is generally depicted in a number of preferred embodiments in FIGS. 1–4. The wagon 10 is preferably provided with a base 12, having a front wall 14, back wall 16, opposite side walls 18 and 20, and a bottom wall 22. The base 12 should be supported by a plurality of rotatable wheels 24. Various configurations of wheels and axles are contemplated, including various three-wheel and four-wheel configurations. A tongue 26 is provided to extend from the forward end portion of the base 12 a sufficient distance to enable a user to stand and pull the base 12 from one location to another while grasping a distal end portion of the tongue 26. While the base 12 is depicted as quite similar in design to a common child's wagon, variations upon the design that provide a greater or fewer number of component parts, such as the aforementioned walls, are contemplated. Likewise, the rectangular shape of the base 12 may be varied according to the circumstances at hand and may be provided in nearly any shape, including oval, round, triangular and the like.

Figure 2:
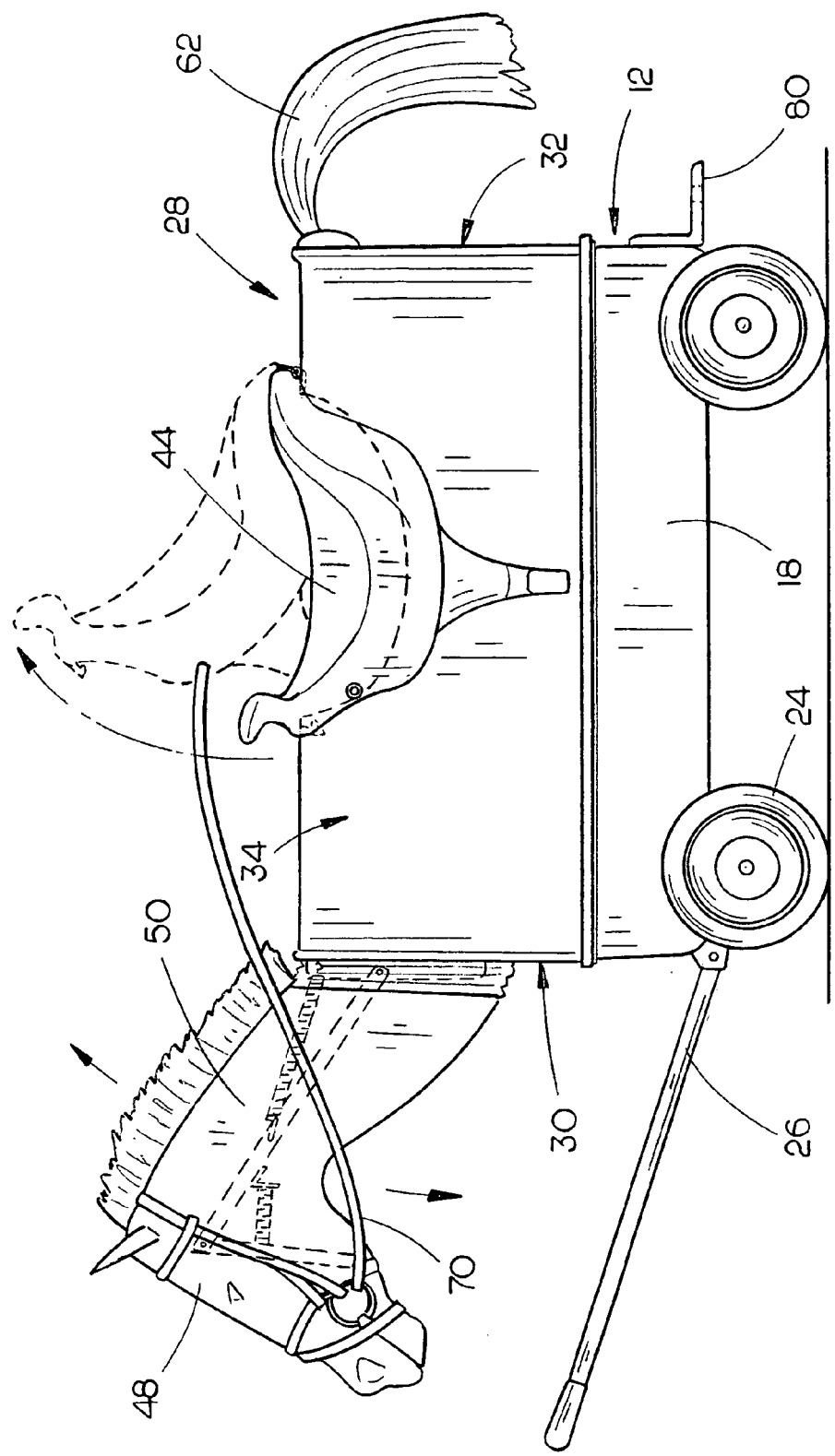
FIG. 2 is a side elevation view of the child's wagon depicted in FIG. 1.
Figure 3:
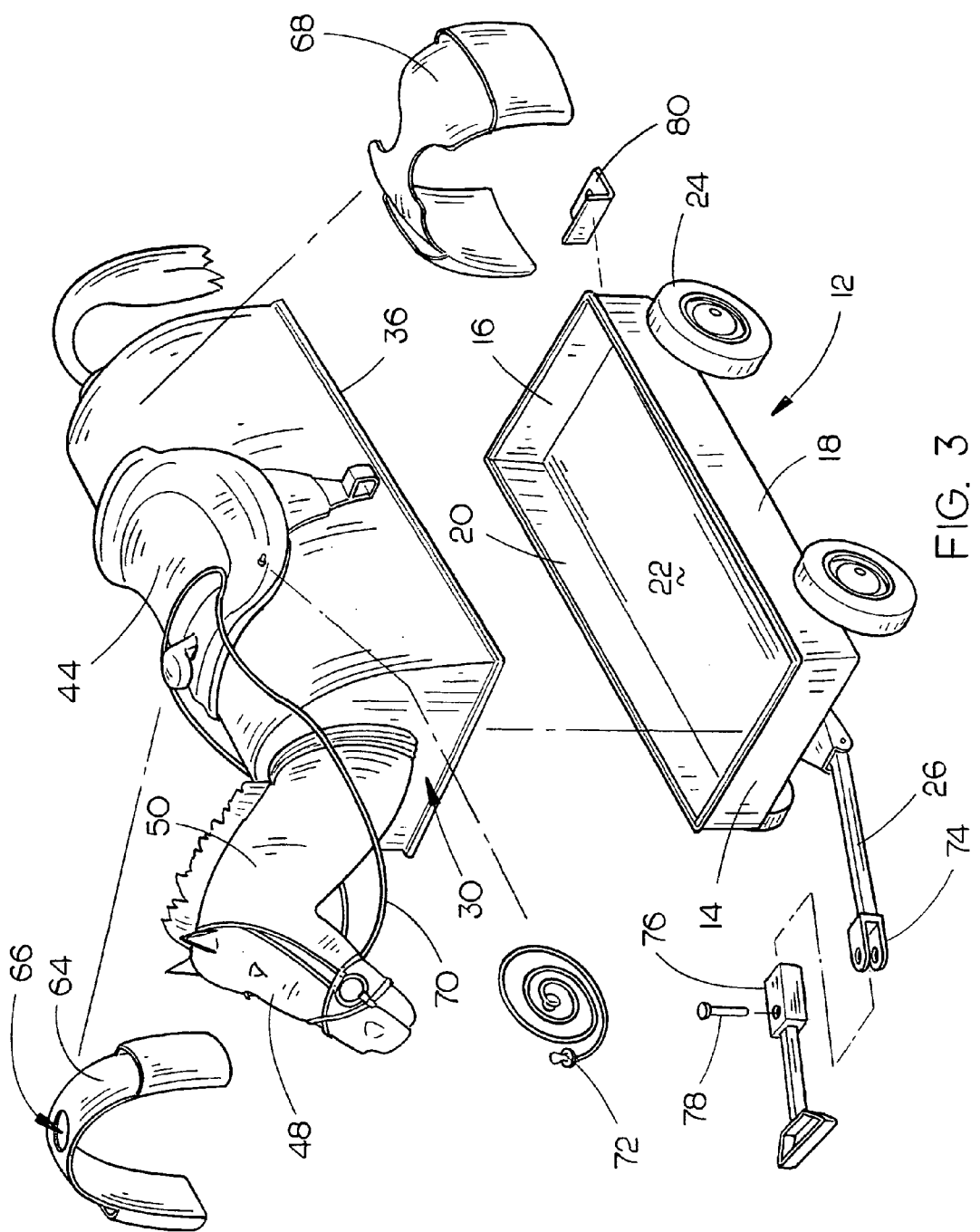
FIG. 3 is a partially exploded isometric view of the child's wagon depicted in FIG. 1.

The wagon 10 should be provided with a body 28, having a forward end portion 30, a rearward end portion 32, an upper end portion 34 and a lower peripheral edge 36. Preferably, the lower peripheral edge 36 of the body 28 will be shaped and sized to approximate an upper peripheral edge portion of the base 12 so that the body 28 and base 12 may be coupled to one another as depicted in FIGS. 1 and 2. It is contemplated that various applications will make it desirable to releasably engage the body 28 with the base 12, providing the user with the ability to disassemble the same for storage or to use the components separately from one another. It is also contemplated, however, that the body 28 and the base 12 could be permanently secured to one another or simply constructed as a single unit.

Where the body 28 and the base 12 are provided as separate components, the bottom 38 of the body 28 may be provided as a solid wall or partially or completely open. Engagement of the body 28 with the base 12 forms an inner cavity 40 that is defined by the interior shapes of the body 28 and the base 12. It is preferred that the inner cavity 40 be provided in a size that is sufficient to temporarily store toys and other desired articles. This configuration provides a substantial storage compartment on a mobile platform when traveling short to moderate distances or as a stationary toy box.

The body 28 may be constructed from a wide range of different materials such as reinforced fiberglass, various plastics, metals and woods. However, it is preferred that the materials and shape of the body 28 provide sufficient strength to support one or more children along the upper end portion 34. One creative method of construction, which aids in recycling, cuts a side portion from a metal drum, longitudinally, in a manner that provides the desired height and overall base dimensions. Irrespective of the materials used, an opening 42 should be formed in the body 28 to provide convenient access to the inner cavity 40. A cover 44 may be provided, having a shape and size that is sufficient to cover the opening 42, when desirable. The cover 44 may be removably coupled with the body 28, with or without various known mechanical connectors. However, it may be preferred to couple the cover 44 with the body 28 adjacent the opening 42 using a hinge 46 that permits the cover 44 to be moved between open and closed positions with respect to the opening 42.

Figure 4:
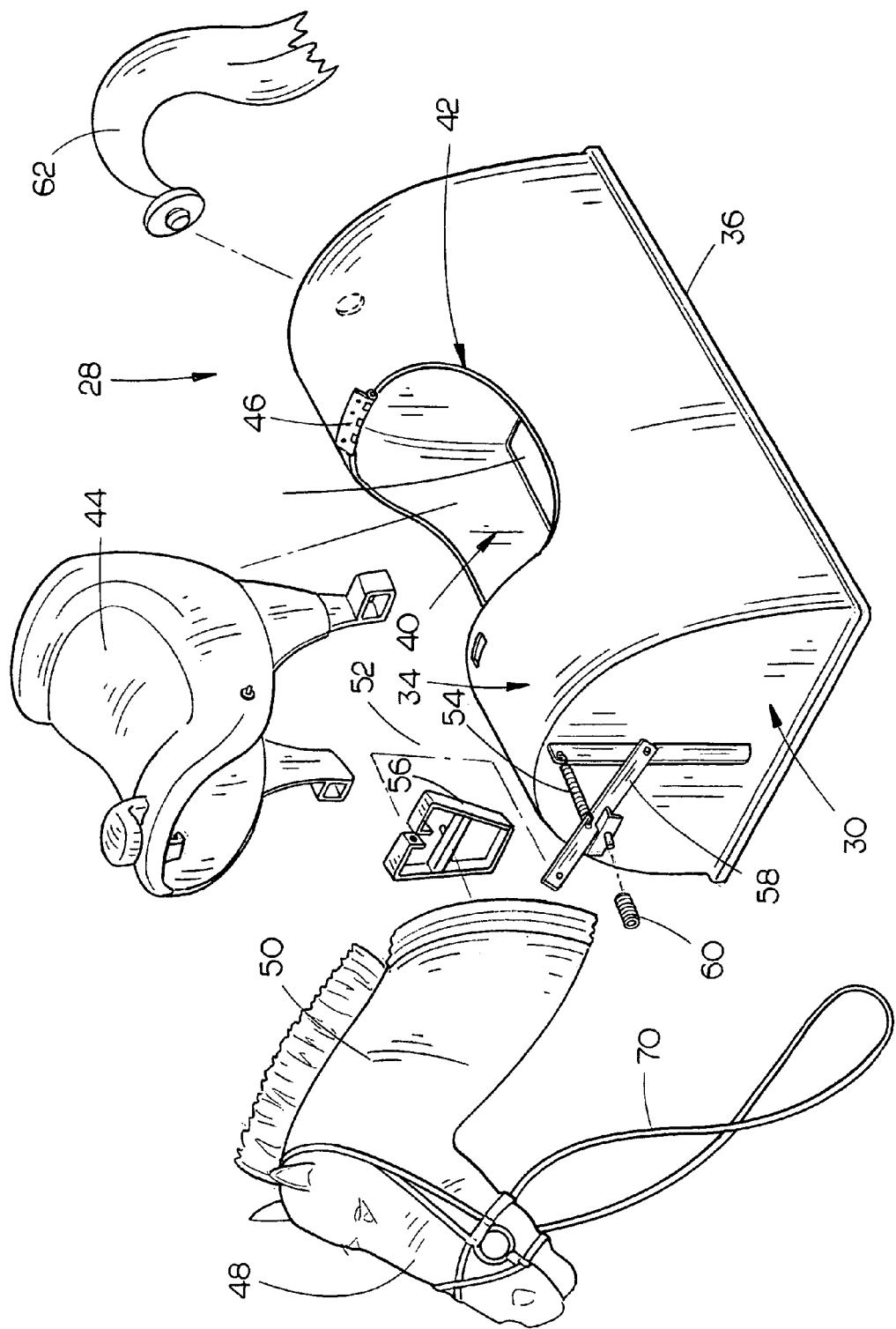
FIG. 4 is a partially exploded isometric view of the body portion of one embodiment of the child's wagon of the present invention.

In a preferred embodiment, the body 28 is configured to resemble an animal, such as a horse. The design characteristics of the wagon 10 easily lend themselves to this end. For example, a simple head 44 may be fabricated and coupled to the forward end portion 30. The head may also be coupled to the forward end portion 30 using a neck 50 to aid in the appearance of the wagon 10. A means for coupling the head with the wagon 10 may also be provided to exhibit natural or life-like movement to the head 48 and/or neck 50 when the wagon 10 is moved. Specifically, a frame 52 may be pivotably coupled to the forward end portion 30 that supports the head 48 and the neck 50 that permits their selective movement in upward and downward directions. A neck spring 54 may be provided to extend from the frame 52, generally intermediate its opposite ends, to the forward end portion 30, as depicted in FIG. 4. The neck spring 54 will keep the head 48 and neck 50 in an upwardly extending position. However, the weight of the head 48, neck 50 and frame 52 will tend to produce an up and down oscillation when the wagon 10 is placed in motion.

Additional realism can be attained from the motion of the head and neck assembly by providing the frame 52 in multiple sections. For example, the frame 52 could be provided in a head section 56 and a neck section 58 that are pivotably coupled to one another, as depicted. The weight of the head 48 and the head section 56 will tend to cause the head 48 to move forward and backward like a pendulum, pivoting on the connection between the head section 56 and the neck section 58. A head spring 60 may be secured to the head section 56 and the neck section 58 at its opposite ends in order to limit the travel of the head 48 in a forward direction and to ensure its rearward travel. These combined structures emulate the head and neck motion exhibited by most quadrupedal animals when walking or galloping. It is contemplated that additional body parts, such as a tail 62 could be secured to the wagon 10 in order to further enhance its animal-like appearance.

Various accessories are contemplated that will enhance the desirable appearance of the wagon 10, provide easy access to various articles, and increase a child's enjoyment of the wagon 10. For example, the cover 44 can be shaped and sized to closely resemble a saddle. Where it is not desirable to fashion an existing saddle into the cover 44, the cover should be shaped to comfortably accommodate one or more children in a manner similar to an actual saddle. A bottle holster may also be provided, having an elongated flexible body and a pair of open-ended receptacles disposed at opposite ends of the body so that, when the bottle holster 64 is draped over the upper end portion of the body 28, the open ends of the receptacles face upwardly from either side of the body 28. An opening 66 may be formed through the body of the bottle holster 64, enabling a user to slide the opening 66 over a saddle horn or other projection extending from the cover 44 or the body 28. Preferably, the bottle holster will be shaped and sized to conveniently carry at least two or more baby bottles. Similarly, a pair of saddle bags 68 may also be supplied in a similar flexible design that may be easily draped over the body 28, as depicted. Preferably, the saddle bags 68 will each be shaped and sized to accommodate a plurality of diapers or other children's supplies. The saddle bags 68 may be loosely draped across the body 28 or secured using any of a wide range of temporary or permanent mechanical fastening devices.

Additional desirable accessories may include a set of reins 70 coupled with the head 48 in a conventional fashion. The reins 70 permit the child to remotely pull on the head 48 and neck 50, actuating their motion. Additionally, the reins provide a measure of security and stability to the child riding the wagon 10. A pacifier 72 may be secured at one end of a resiliently deformable coil that is adorned to closely resemble a rope. The opposite end of the cord may be releasably or permanently secured with the cover 44. In this arrangement, the pacifier 72 is easily accessible by the child and will not be dropped to the ground or left behind.

To provide for a greater flexibility in transportation, the tongue 26 may be provided with a link assembly that permits the tongue to separate into a handle section and a tow bar that may be used to secure the wagon to motive devices, such as a riding lawnmower, tractor, and the like. In a preferred embodiment, depicted in FIG. 3, the link assembly may be comprised of a hitch 74 that is shaped to releasably engage the rearward end portion of a motive device. The link assembly may be provided with a receiver 76 to releasably engage the hitch 74, using a pin 78 or other such mechanical locking mechanism. Similarly, a tow assembly 80 may be coupled to the rearward end portion of the wagon 10 so that a second wagon, or other such towable device, and be releasably coupled to the wagon 10.

In the drawings and in the specification, there have been set forth preferred embodiments of the invention and although specific items are employed, these are used in a generic and descriptive sense only and not for purposes of limitation. Changes in the form and proportion of parts, as well as a substitution of equivalents, are contemplated as circumstances may suggest or render expedient without departing from the spirit or scope of the invention as further defined in the following claims.

Thus it can be seen that the invention accomplishes at least all of its stated objectives.

We claim:

1. A child's wagon, comprising:
   a base having an upper peripheral edge portion and an open interior, defined by a forward wall, a rearward wall, opposite sides and a bottom wall; said base being operatively coupled to and supported by a plurality of wheels;
   an elongated tongue, having first and second ends, operatively coupled at its first end to a forward end portion of the wagon;
   a body having an upper end portion, a lower peripheral edge, forward and rearward end portions, opposite side portions, and an open bottom; said lower peripheral edge being operatively coupled with the upper peripheral edge portion of said base;
   an opening, formed in said body, that is in communication with an inner cavity between said base and said body;
   a cover operatively coupled with said body adjacent said opening; said cover being sized and shaped to selectively close said opening;
   a head, shaped to resemble an animal head, operatively coupled to said forward portion of the wagon; and
   connective means for coupling said head with the forward end portion of the wagon such that said head is capable of selective independent movement with respect to said body;
   said body being at least partially rigid and shaped so that at least one child may conveniently sit closely adjacent said body to ride the wagon.

2. The wagon of claim 1 further comprising a head, shaped to resemble an animal head, operatively coupled to said forward portion of the wagon.

3. The wagon of claim 1 wherein said connective means permits independent movement of said head that resembles life-like motion attained by the animal, to which said head resembles, when the animal moves in at least a forward direction.

4. The wagon of claim 1 wherein said connective means is comprised of a frame and at least one spring that are operatively coupled with said head.

5. The wagon of claim 4 wherein said frame is pivotably coupled to said forward portion of the wagon to permit generally upward and downward movement of said frame.

6. The wagon of claim 5 wherein said connective means is comprised of a neck that extends from said forward end portion of the wagon to the head and is supported by at least a portion of said frame.

7. The wagon of claim 6 wherein said frame is comprised of a head section and a neck section that are pivotably coupled to one another.

8. The wagon of claim 7 wherein said neck section is provided with opposite first and second ends; said first end being coupled with said head section and said second end being coupled with the forward end portion of the wagon; said neck section being provided with a neck spring that extends from said neck section, intermediate said first and second ends, and is operatively coupled with the forward end portions of the wagon to support said neck section and enable said neck section to automatically move up and down in response to various movements of the wagon.

9. The wagon of claim 2 further comprising a tail, shaped to resemble an animal tail, operatively coupled to a rearward portion of the wagon.

10. The wagon of claim 9 wherein said head and tail resemble a horse's head and tail.

11. The wagon of claim 1 wherein said cover is shaped to resemble a saddle and is selectively movable between open and closed positions with respect to said opening in said body.

12. A child's wagon, comprising:
    a base having an upper peripheral edge portion and an open interior, defined by a forward wall, a rearward wall, opposite sides and a bottom wall; said base being operatively coupled to and supported by a plurality of wheels;
    an elongated tongue, having first and second ends, operatively coupled at its first end to a forward end portion of the wagon;
    a body having an upper end portion, a lower peripheral edge, forward and rearward end portions, opposite side portions, and an open bottom; said lower peripheral edge being operatively coupled with the upper peripheral edge portion of said base;
    an opening, formed in said body, that is in communication with an inner cavity between said base and said body;
    a cover operatively coupled with said body adjacent said opening; said cover being sized and shaped to selectively close said opening;
    a hinge that pivotably couples said cover to said body;
    a head, shaped to resemble a horse's head, operatively coupled to said forward portion of the wagon; and
    a tail, shaped to resemble a horse's tail, operatively coupled to a rearward portion of the wagon;
    said body being at least partially rigid and shaped so that at least one child may conveniently sit closely adjacent said body to ride the wagon.

13. A child's wagon, comprising:
    a base having an upper peripheral edge portion and an open interior, defined by a forward wall, a rearward wall, opposite sides and a bottom wall; said base being operatively coupled to and supported by a plurality of wheels;
    an elongated tongue, having first and second ends, operatively coupled at its first end to a forward end portion of the wagon;
    a body having an upper end portion, a lower peripheral edge, forward and rearward end portions, opposite side portions, and an open bottom; said lower peripheral edge being operatively coupled with the upper peripheral edge portion of said base;
    an opening, formed in said body, that is in communication with an inner cavity between said base and said body;
    a cover operatively coupled with said body adjacent said opening; said cover being sized and shaped to selectively close said opening; said cover being shaped to resemble a saddle; said cover being selectively movable between open and closed positions with respect to said opening in said body; and
    a bottle holster comprising an elongated body having open-ended receptacles disposed at opposite ends of said body so that when the bottle holster is draped over the upper end portion of said body the open ends of said open-ended receptacles face upwardly from either side of said body;
    said body being at least partially rigid and shaped so that at least one child may conveniently sit closely adjacent said body to ride the wagon.

14. The wagon of claim 13 wherein said bottle holster is provided with an opening intermediate its opposite end portions that is sized to permit a saddle horn on said cover to be passed through said opening so that said bottle holster may be hung from said cover.

15. A child's wagon, comprising:
a base having an upper peripheral edge portion and an open interior, defined by a forward wall, a rearward wall, opposite sides and a bottom wall; said base being operatively coupled to and supported by a plurality of wheels;
an elongated tongue, having first and second ends, operatively coupled at its first end to a forward end portion of the wagon;
a body having an upper end portion, a lower peripheral edge, forward and rearward end portions, opposite side portions, and an open bottom; said lower peripheral edge being operatively coupled with the upper peripheral edge portion of said base;
an opening, formed in said body, that is in communication with an inner cavity between said base and said body;
a cover operatively coupled with said body adjacent said opening; said cover being sized and shaped to selectively close said opening; said cover being shaped to resemble a saddle: said cover being selectively movable between open and closed positions with respect to said opening in said body; and
a pair of saddlebags that are comprised of a flexible material so that said saddlebags may be draped over the upper end portion of said body adjacent said cover; said saddlebags being shaped and sized to carry a plurality of diapers;
said body being at least partially rigid and shaped so that at least one child may conveniently sit closely adjacent said body to ride the wagon.

16. A child's wagon, comprising:
a base having an upper peripheral edge portion and an open interior, defined by a forward wall, a rearward wall, opposite sides and a bottom wall; said base being operatively coupled to and supported by a plurality of wheels;
an elongated tongue, having first and second ends, operatively coupled at its first end to a forward end portion of the wagon;
a body having an upper end portion, a lower peripheral edge, forward and rearward end portions, opposite side portions, and an open bottom; said lower peripheral edge being operatively coupled with the upper peripheral edge portion of said base;
an opening, formed in said body, that is in communication with an inner cavity between said base and said body;
a cover operatively coupled with said body adjacent said opening; said cover being sized and shaped to selectively close said opening; said cover being shaped to resemble a saddle; said cover being selectively movable between open and closed positions with respect to said opening in said body; and
a pacifier coupled to one end of an elongated, coil-shaped cord the opposite end of said cord being operatively coupled to the cover; said cord being comprised of resiliently deformable material so that said cord tends to retain a coil-shape;
said body being at least partially rigid and shaped so that at least one child may conveniently sit closely adjacent said body to ride the wagon.

17. The wagon of claim 1 wherein said tongue is provided with a link assembly, intermediate the first and second ends of said tongue, that permits said tongue to be separated into a handle section and a tow bar section, which remains coupled to said forward end portion of the wagon.

18. The wagon of claim 17 wherein a distal end of said tow bar section is provided with a hitch to be coupled to a motive device and a proximal end of said handle section is provided with a receiver that is shaped to releasably engage said hitch.

* * * * *